United States Patent Office 3,422,039
Patented Jan. 14, 1969

3,422,039
METHOD FOR PRODUCING SILYLMETHYLENE POLYMER[ELASTOMER]
Nikolai Sergeevich Nametkin, Valentin Mikhailovich Vdovin, and Valery Ivanovich Zavyalov, Moscow, U.S.S.R., assignors to Institute Neftekhimicheskogo Sinteza im. S.V. Topchieva, Moscow, U.S.S.R.
No Drawing. Filed June 16, 1965, Ser. No. 464,543
U.S. Cl. 260—2
Int. Cl. C08g 31/34; C08g 31/32; C07f 7/20
9 Claims

ABSTRACT OF THE DISCLOSURE

A method for the preparation of a high-molecular weight silylmethylene elastomer-type polymer by subjecting 1,1,3,3-tetramethyl-1,3-disilacyclobutane which has been preliminarily purified from absorbed air components and moisture to thermal polymerization at temperatures below 250° C.

---

This invention relates to methods of producing polymeric silicone compounds of the

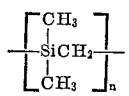

type. This polymer is distinguished from its structural analogue, dimethylpolysiloxane, which is widely used in technology, by its high chemical stability while retaining high thermal stability.

The following prior-art methods of producing polymers of the aforesaid type are known:

(1)
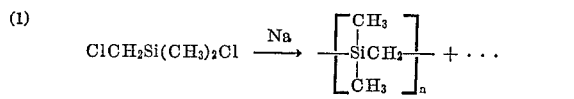

(2)
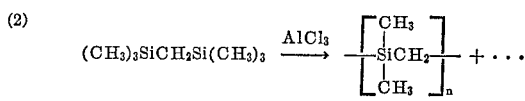

(3)
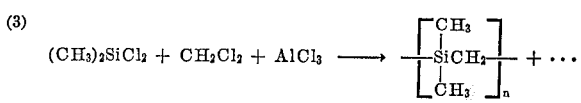

(4) A method is also known of polymerizing 1,1,3,3-tetramethyl-1,3-disilacyclobutane in an inert atmosphere at a temperature of at least 250° C. under pressure. Said methods result in low-molecular, oily products of molecular weights not exceeding 15,000.

The disadvantage of prior-art methods is that they yield liquid silylmethylene polymers of low molecular weight.

It is an object of the present invention to provide a method of producing polymers having substantially higher molecular weights and constituting solid rubber-like substances.

Another object of the invention is to produce chemically stable polymers.

Still another object of the invention is to produce polymers of high thermal stability.

A still further object of the invention is to provide a method and elaborate the conditions for polymerizing 1,1,3,3-tetramethyl-1,3-disilacyclobutane so as to produce high-molecular weight elastomers.

The objects of the invention are achieved by polymerizing 1,1,3,3-tetramethyl-1,3-disilacyclobutane at reduced pressure, preferably in a vacuum of 10 to $10^{-3}$ mm. Hg or in an inert atmosphere, at a temperature of 150–250° C., preferably 150–200° C., using monomer which has been freed from occluded air in a vacuum of 10 to $10^{-3}$ mm. Hg over an active drying agent to remove traces of moisture.

When carried out according to said method, polymerization enables the production, in practically quantitative yield, of elastomers possessing high chemical resistance and mechanical strength, by the reaction indicated as follows:

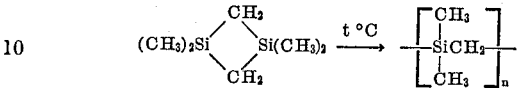

The resulting polymers (elastomers) have a molecular weight of from $2 \times 10^5$ to $6 \times 10^6$.

For a better understanding of the invention by those skilled in the art, the following examples of the production of polymers (elastomers) are given by way of illustration, the polymerization being effected in both cases at a temperature between 150 and 200° C.

Example 1

25 g. of 1,1,3,3-tetramethyl-1,3-disilacyclobutane, which has been freed from occluded air at $10^{-3}$ mm. Hg over metallic potassium, is recondensed in an ampoule under a vacuum of $10^{-3}$ mm. Hg, and the ampoule is sealed and heated for 6 hours.

As a result of polymerization, 17.5 g. of a silylmethylene elastomer is obtained (70% yield with respect to the initial monomer), having a molecular weight of $4 \times 10^6$, as determined by the light-diffusion method.

Example 2

25 g. of 1,1,3,3-tetramethyl-1,3-disilacyclobutane, which has been freed from occluded air at 10 mm. Hg over metallic potassium, is recondensed in an ampoule under a vacuum of 10 mm. Hg, and the ampoule is sealed and heated for 6 hours.

As a result of polymerization, 22 g. of a silylmethylene elastomer is obtained (90% yield with respect to the initial monomer), having a molecular weight of $4 \times 10^5$, as determined by the light-diffusion method.

Na, LiH or CaH$_2$ or any other active drying agent, can be used in place of the potassium.

Although the present invention has been described in accordance with a preferred embodiment, it will be obvious to those skilled in the art that various changes and modifications may be made without departing from the spirit and scope of the invention, as presented in the description and claimed in the appended claims.

What is claimed is:

1. A method for producing a silylmethylene elastomeric polymer, said method comprising purifying 1,1,3,3-tetramethyl-1,3-disilacyclobutane by treating same at a reduced pressure in the presence of an active drying agent to remove air and moisture therefrom and heating the thusly purified 1,1,3,3-tetramethyl-1,3-disilacyclobutane in the absence of a catalyst to a temperature of 150° to 250° C. at a reduced pressure.

2. A method according to claim 1 wherein the 1,1,3,3-tetramethyl-1,3-disilacyclobutane is treated at a pressure of 10 to $10^{-3}$ mm. Hg and the active drying agent is potassium, sodium, lithium hydride or calcium hydride.

3. A method according to claim 1 wherein the purified 1,1,3,3-tetramethyl-1,3-disilacyclobutane is heated to a temperature of 150–200° C.

4. A method according to claim 3 wherein the purified 1,1,3,3-tetramethyl-1,3-disilacyclobutane is heated at a pressure of 10 to $10^{-3}$ mm. Hg.

5. A method according to claim 2 wherein the purified 1,1,3,3-tetramethyl-1,3-disilacyclobutane is heated to a temperature of 150–200° C. at a pressure of 10 to $10^{-3}$ mm. Hg.

6. A method for producing a silylmethylene elastomeric polymer, said method comprising purifying 1,1,3,3-tetramethyl-1,3-disilacyclobutane by treating same at a reduced pressure in the presence of an active drying agent to remove air and moisture therefrom and heating the thusly purified 1,1,3,3-tetramethyl-1,3-disilacyclobutane in the absence of a catalyst to a temperature of 150° to 250° C. in an inert atmosphere.

7. A method according to claim 6 wherein the 1,1,3,3-tetramethyl-1,3-disilacyclobutane is treated at a pressure of 10 to $10^{-3}$ mm. Hg and the active drying agent is potassium, sodium, lithium hydride or calcium hydride.

8. A method according to claim 6 wherein the purified 1,1,3,3-tetramethyl-1,3-disilacyclobutane is heated to a temperature of 150–200° C.

9. A method according to claim 7 wherein the purified 1,1,3,3-tetramethyl-1,3-disilacyclobutane is heated to a temperature of 150–200° C.

References Cited

UNITED STATES PATENTS

| | | | |
|---|---|---|---|
| 2,850,514 | 9/1958 | Knoth | 260—448.2 |
| 3,178,392 | 4/1965 | Kriner | 260—2 |
| 3,293,194 | 12/1966 | Lovie et al. | 260—2 |

SAMUEL H. BLECH, *Primary Examiner.*

U.S. Cl. X.R.

260—448.2